June 3, 1930.  L. N. PORTER ET AL  1,761,364
INCUBATOR
Filed Nov. 10, 1928   3 Sheets-Sheet 1

INVENTORS
L. N. Porter &
B. F. C. Morris
BY
ATTORNEY.

June 3, 1930.    L. N. PORTER ET AL    1,761,364
INCUBATOR
Filed Nov. 10, 1928    3 Sheets-Sheet 2
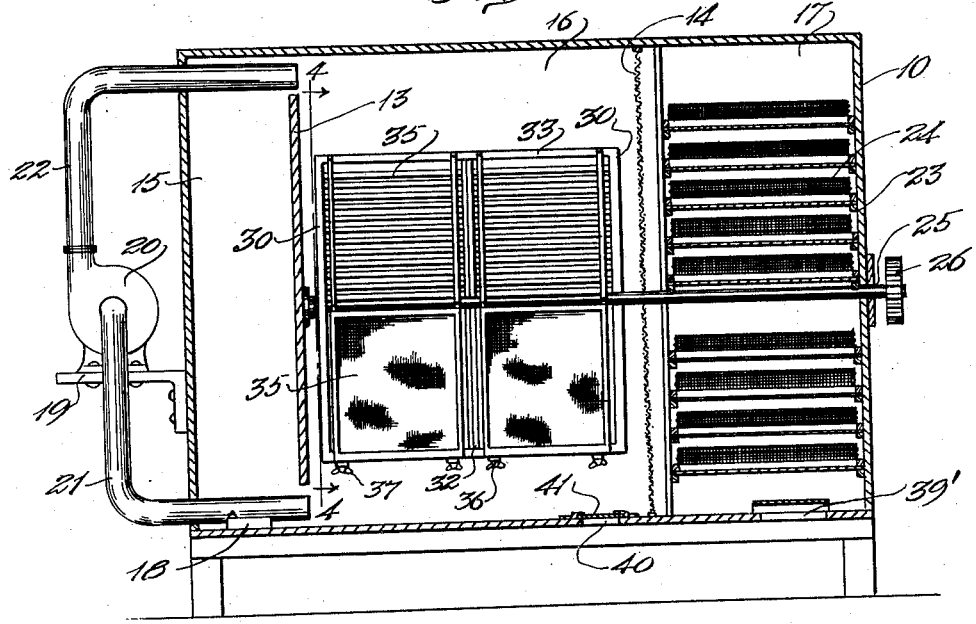
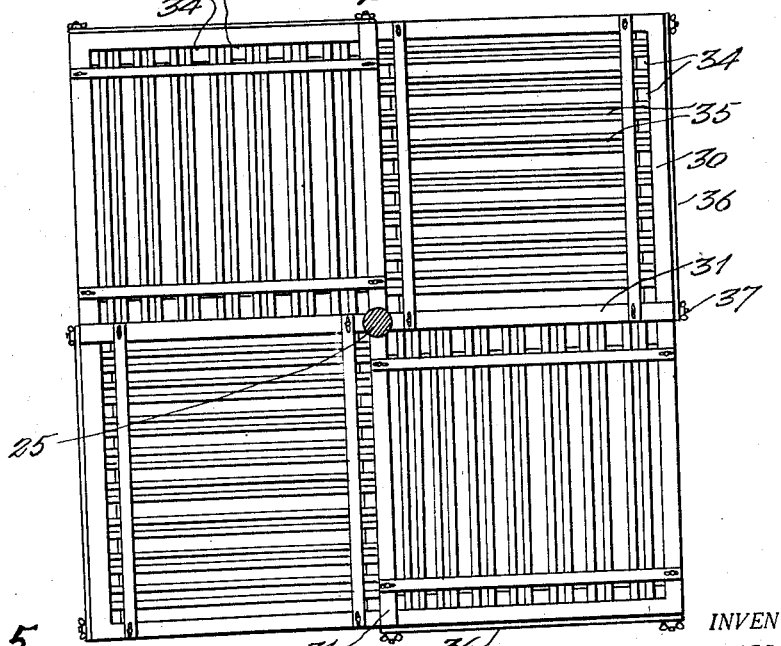
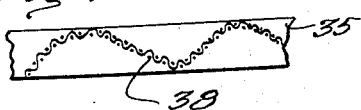
INVENTORS
L. N. Porter & B. F. C. Morris,
BY
ATTORNEY June 3, 1930.  L. N. PORTER ET AL  1,761,364
INCUBATOR
Filed Nov. 10, 1928   3 Sheets-Sheet 3
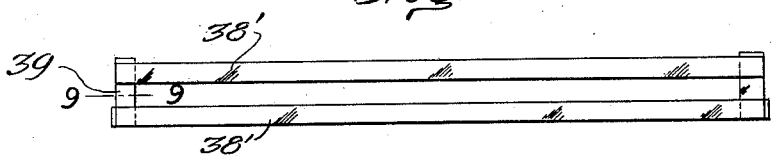
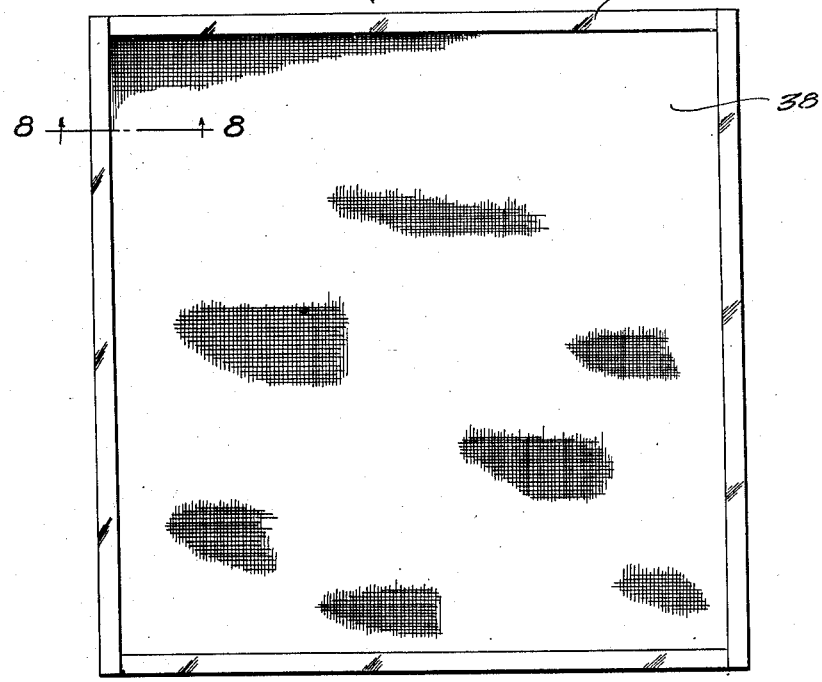
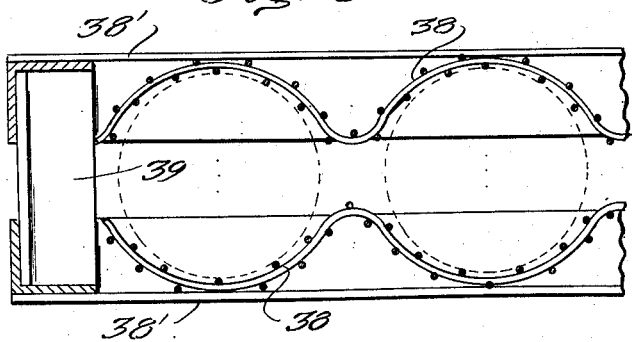
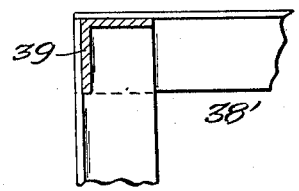
INVENTORS
L. N. Porter & B. F. C. Morris,
BY
ATTORNEY Patented June 3, 1930

1,761,364

UNITED STATES PATENT OFFICE

LOUIS N. PORTER AND BENJAMIN FREDK. C. MORRIS, OF EL RENO, OKLAHOMA

INCUBATOR

Application filed November 10, 1928. Serial No. 318,479.

This invention relates to incubators and has special reference to an automatic egg turning incubator.

One important object of the invention is to improve the general construction of devices of this character.

A second important object of the invention is to provide an improved form of rotating egg carrier for use in such incubators, which carrier is so arranged as to permit ready loading and unloading of the incubator from a single side.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and Figure 1 is a front view of an incubator constructed in accordance with this invention.

Figure 3 is a section on the line 3—3 of Figure 2.

Figure 4 is an enlarged section on the line 4—4 of Figure 3.

Figure 5 is a detailed section to large scale through a portion of one of the egg trays.

Figure 6 is an edge view of one of the egg trays.

Figure 7 is a plan view thereof.

Figure 8 is an enlarged detail section on the line 8—8 of Figure 7.

Figure 9 is an enlarged detail section on the line 9—9 of Figure 6.

Figure 1:
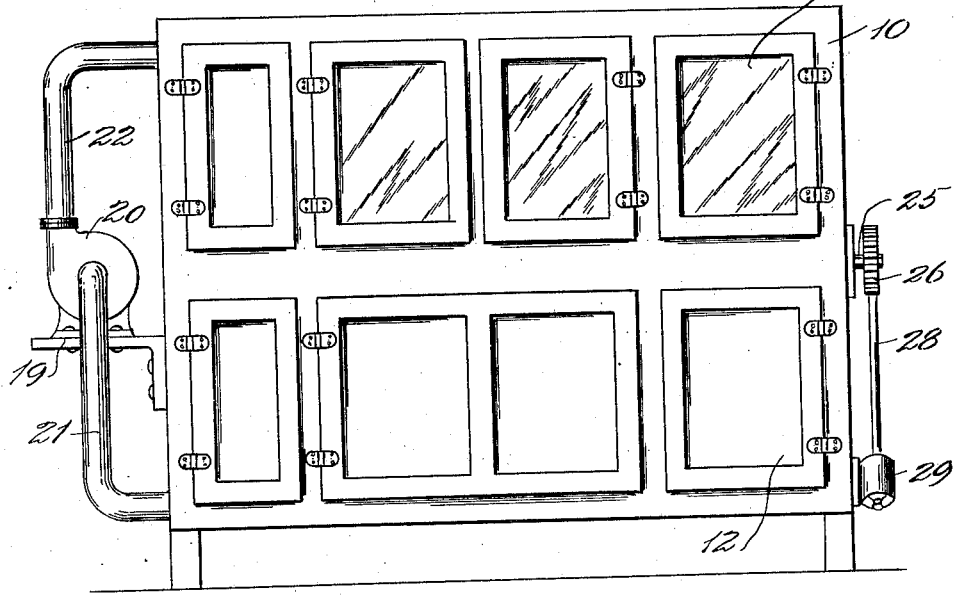
Figure 2:
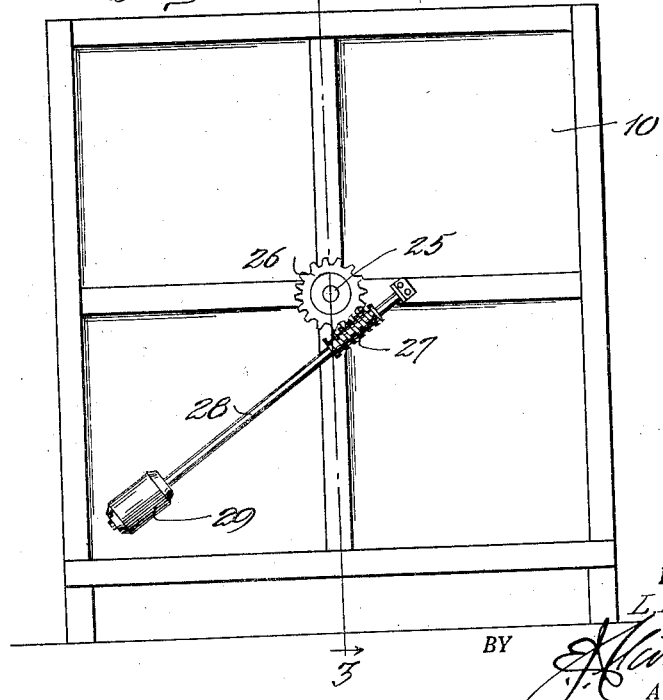
Figure 2 is an end view thereof.

In the embodiment of the invention herein illustrated there is provided a casing 10 having on its front side glazed upper doors 11 and lower doors 12 which may or may not be glazed as may be desired. Within the casing 10 adjacent one end is a partition 13 which extends from front to back of the casing but which terminates in spaced relation to the top and bottom of said casing. Also adjacent the other end of the casing is a partition 14 of fine gauze which will permit the passage of air slowly but which will not permit the floating about of down from young chicks and the like, this partition likewise preventing strong air drafts from striking the hatching eggs or young chicks. Thus these partitions divide the casing, in its width, into a heating chamber 15, an incubating chamber 16, and a hatching chamber 17. In the bottom of the heating chamber is a heating device 18 here indicated as an ordinary flat heating unit such as is used in electric ovens and the like, but any preferred means of heating may be utilized as the invention is not restricted to a special form of heating device. Mounted on a suitable bracket 19 is a motor driven blower 20 wherefrom a suction pipe 21 leads into the bottom of the heating chamber and terminates about even with the opening between the partition 13 and the bottom of the casing. Similarly, a supply pipe 22 leads from the blower through the top of the heating chamber and terminates about at the opening between the top of said partition and the top of the casing. In the hatching chamber is arranged a series of pairs of bars 23 whereon removably rest the hatching trays 24 each of which has the usual bottom and netting sides. Through the incubating and the hatching chamber extends a shaft 25 which projects through the end wall of the casing 10 and carries a worm wheel 26 which is engaged by worm gear 27 mounted on a shaft 28 forming an extension of the shaft of the electric motor 29. This motor receives its current in the usual manner and is controlled by any suitable switch which may either be an ordinary switch to give constant motion to the shaft 25 or may be a switch to supply current at intervals to the motor. It is to be understood that the particular form of switch forms no part of the present invention but there may be used with this incubator any desired form. Within the incubating chamber there is mounted on the shaft 25 a pair of spaced end frames 30 each of which has cross bars 31 which divide the frame into four equal and rectangular portions. Between these end frames is a similar intermediate frame 32 and the frames are connected by transverse bars 33.

There is thus formed a plurality of sets of four frames and in each quarter the frames support guide strips 32 on which rest the egg trays 35 which are held in the frames by straps 36 removably secured by the thumb nuts 37.

It is to be observed that the guide strips 34 are so arranged that the rotation of the frame by the shaft through one complete revolution brings each set of egg trays into horizontal position opposite the charging doors 11 in succession. To this end the trays in diagonally disposed quarters extend in parallel directions but the trays in one pair of diagonal quarters are at right angles to the trays in the other pair as can clearly be seen with reference to Figure 4. Each of these trays consist of upper and lower sections having their bottoms formed by corrugated sheets of wire 38 so that the eggs are held in position therebetween.

These upper and lower sections also have similar frames 38' and at each corner of one of these frames is a leg or distance piece 39 which fits inside of the other frame to hold the frames in properly spaced position so that eggs laid end to end in the corrugated grooves will not be crushed or broken. Under this arrangement a free circulation of air may be had around all the eggs and these eggs may thus be kept uniformly heated at the proper degree for incubation as well at the centers of the trays as at their outer portions.

In the bottom of the hatching compartment ventilating means 39' is provided and in the bottom of the incubating compartment there are ventilating openings 40 each normally closed by door 41. While there have been only two sets of four frame racks shown it is obvious that there may be as many of these racks as are desired in accordance with the size of the machine and that more than one tier of hatching racks may be used without changing the arrangement or principle of the invention.

It is to be noted that if desired a small electric fan may be inserted at any convenient place on the floor to assist the circulation.

In the manner of using the device the eggs are placed in the channels or rows of the egg trays lying on their sides in a natural position with end to end, and the top parts of the trays are closed down over them. These trays are then shoved in on the bars 34 of the cage or frame and locked in by the vertical bars 36. The eggs do not again have to be touched by hand, since they are turned automatically eighteen days from the time they are placed in the incubating chamber. At the expiration of this time (just before they are ready to begin pipping their shells) the trays are removed from the cage and the eggs are transferred to the hatching trays 24 and shoved into the hatching compartment where they are left undisturbed until the chicks are all hatched out.

In order to effect the transfer of the eggs from the incubating to the hatching tray, the latter is made slightly larger than the incubating tray and upon withdrawal of the latter the top half is removed and the infertile eggs are picked out and the hatching tray inverted and placed over the incubating tray and the two inverted while held together. Then the lower half of the incubating tray is removed and the hatching tray placed in its compartment.

With this process of incubation, continuous hatching can be carried on, eggs being set as often as desired.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In an incubator, a casing having access doors, a shaft extending horizontally through said casing, motor means to revolve said shaft, egg tray rack frames fixed to said shaft with the shaft extending centrally between the frames, the frames forming a rectangular prism divided into rectangular quarters, the racks in each quarter being parallel and the racks in each quarter being arranged at right angles to the racks in adjacent quarters, said shaft being positioned so that the racks in the respective quarters are horizontal when opposite said doors, and means to secure egg trays in said racks.

2. In an incubator, a casing having access doors, a shaft extending horizontally through said casing, motor means to intermittently revolve said shaft, egg tray rack frames fixed to said shaft with the shaft extending centrally between the frames, the frames forming a rectangular prism divided into rectangular quarters, the racks in each quarter being parallel and the racks in each quarter being arranged at right angles to the racks in adjacent quarters, said shaft being positioned so that the racks in the respective quarters are horizontal when opposite said doors, means to secure egg trays in said racks, and means to maintain a constant current of warm air through said trays in all positions of the latter.

In testimony whereof we affix our signatures.

LOUIS N. PORTER.
BENJAMIN FREDK. C. MORRIS.